United States Patent Office 3,573,993
Patented Apr. 6, 1971

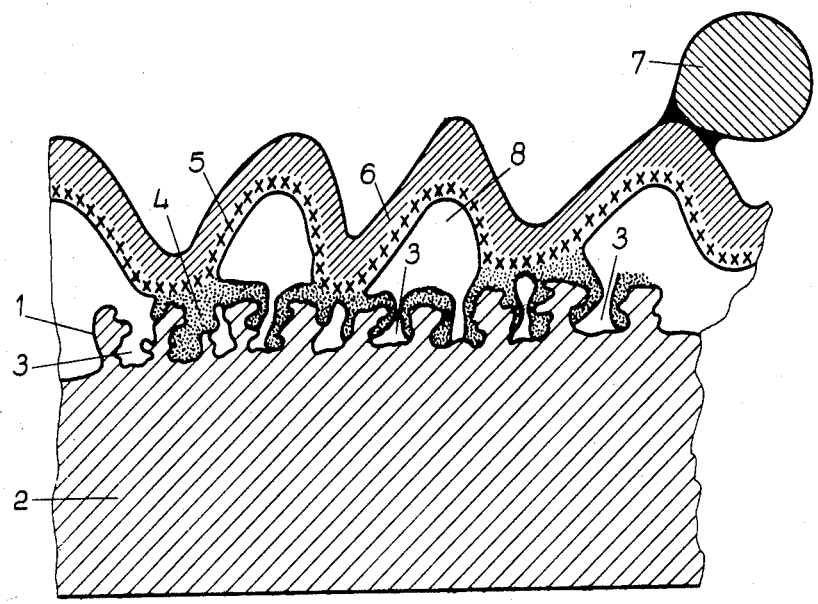

3,573,993
OXYGEN ELECTRODE COMPOSED OF MIXED OXIDES OF PRASEODYMIUM, CHROMIUM, NICKEL AND COBALT
Wilfried Pabst, Pittsburgh, Pa., and Gerd Sandstede, Frankfurt am Main, and Gerhard Walter, Steinbach, Taunus, Germany, assignors to Robert Bosch G.m.b.H., Stuttgart, Germany
Filed Dec. 4, 1968, Ser. No. 780,991
Claims priority, application Germany, Dec. 23, 1967,
P 16 71 721.8
Int. Cl. H01m 13/00, 27/00
U.S. Cl. 136—120            9 Claims

ABSTRACT OF THE DISCLOSURE

Oxygen electrode suitable as cathode in fuel cells. Mixed oxides of praseodymium, chromium, nickel and/or cobalt are lodged in spaces formed on the surface of the solid electrode material and the electrical conductor of the electrode is made of heat resistant steel.

SUMMARY OF THE INVENTION

This invention generally relates to electrodes and is particularly directed to an oxygen electrode for galvanic cells of the kind wherein a solid electrolyte, capable of conducting oxygen ions, is connected with an electrical conductor by means of an oxidic electrode material. The inventive oxygen electrode is particularly suitable for use as cathode in fuel cells.

As is known, the phenomena that take place at the oxygen electrode of a galvanic cell having an oxygen ion conducting solid electrolyte, are dependent on whether the electrode acts as cathode or anode. If the electrode acts as cathode, a conversion of molecular oxygen into oxygen ions having two negative charges with collection of electrons takes place. By contrast, if the electrode acts as anode, the reverse phenomenon takes place with resulting loss of electrons. The electrode, therefore, has essentially to fulfill two functions, to wit, (1) To catalyze the collection or discharge of electrons in respect to the oxygen, or
(2) to render possible the input or output of electrical current.

Due to the relatively low specific conductivity of the oxygen ion conducting solid electrolyte, which conductivity increases with the temperature, it is desirable to operate the galvanic cells at as high a temperature as possible. It has thus been suggested to operate at working temperature of, for example, 1050° C. (D. H. Archer et al., "Solid Electrolyte Batteries," 18th Annual Power Sources Conference, May 19–21, 1964).

Platinum, silver and mixed oxides have hitherto been suggested as suitable materials for oxygen electrodes.

It will be appreciated, however, that platinum is too expensive and thus uneconomical for large-scale use (see H. Binder et al., Elektrochemica Acta 8, 1963, page 781; D. H. Archer et al., supra).

In respect to silver (U.S. Patents Nos. 3,138,487; 3,138,488 and 3,138,490), it must be considered that this metal vaporizes at temperatures above 900° C. so rapidly that silver electrodes are only suitable, from a practical point of view, if the operating temperature of the cell is at the most 800° C. and, preferably, lower.

In respect to the mixed oxides referred to, proposals in that respect have been advanced in South African Patent 632,667, East German Patent 22,030, and French Patent 1,482,720. The mixed oxides proposed in these prior art disclosures are stable in oxygen at the desired high working temperatures and also catalyze the electron transfer in respect to the oxygen. Moreover, some of these proposed mixed oxides have a sufficiently large electronic conductivity, so that they are capable to effect the passage of the current, without any unsurmountable energy losses.

In practical operation, however, it has been found that these known oxidic electrode materials have a number of inherent drawbacks and difficulties that could not be overcome. The primary difficulty is thus that the known mixed oxides are brittle and, hence, are unsuitable to serve as electrical conductors over longer distances, particularly in the region out of the hot zone of the galvanic cell.

Accordingly, it is a primary object of the present invention to provide for an electrode material for oxygen electrodes of the indicated kind which is superior to the prior art materials, which is economcal to manufacture and which is capable of withstanding high operating temperatures.

A further object of the invention is to provide a material for oxygen electrodes of the indicated kind which has superior electrical conductivity and very good mechanical stability.

Generally, it is an object of the present invention to improve on the art of oxygen electrodes as presently practiced.

Briefly, and in accordance with the invention, the above objects are successfully attained by employing an oxidic electrode material which contains praseodymium, chromium, nickel and/or cobalt and by manufacturing the electrical conductor from scale-comprising steel whose oxide or scale layer is in intimate bonding contact or intertwined with the oxidic electrode material.

The inventive oxygen electrode exhibits superior electrochemical activity and mechanical stability. Moreover, the inventive electrode has superior electrical current input and output characteristics, even at the relatively high operating temperatures. The prohibitively high costs resulting from the use of electrodes employing noble metals are thus effectively avoided by the inventive electrode.

In accordance with the invention, the mixed oxide referred to contains advantageously 90 to 50% by weight of praseodymium oxide, 10 to 50% by weight of chromium oxide, 10 to 50% by weight of nickel oxide or 10 to 50% by weight of cobalt oxide.

According to another embodiment of the invention, the mixed oxide contains 90 to 50% by weight of praseodymium oxide and 10 to 50% by weight of nickel oxide, as well as 10 to 50% by weight of chromium oxide, the total chromium and nickel oxide content amounting to not less than 10% by weight, but not more than 50% by weight.

The various features of novelty which characterize the invention are pointed out with particularity in the claims annexed to and forming a part of this specification. For a better understanding of the invention, its operating advantages and specific objects attained by its use, reference should be had to the accompanying drawing in which there is illustrated and described a preferred embodiment of the invention.

The single figure of the drawing shows an embodiment of an inventive oxygen electrode, partly in section.

Referring now to the drawing, reference numeral 2 indicates a solid electrolyte capable of conducting oxygen ions and being gas-impermeable. The top surface 1 of the solid electrolyte 2 has been rendered rough or irregular by sintering thereonto solid electrolyte powder. In this manner, cavities or spaces 3 are formed which are partially filled by the oxidic electrode material 4 proper. The concentration or density of the electrode material 4 within the spaces or cavities 3 is so great that the individual particles of the electrode material have electrical contact with each other.

The electrode material 4 is moreover in electrical contact with a scale layer 5 of a heat resistant steel 6. The scale layer consists of oxides. It is important that the electrode material 4 is in intimate bonding contact with the scale layer 5 and, in a preferred embodiment, the two layers are actually grown together by surface diffusion. The steel 6 is of a composition and structure so as to exhibit satisfactory permeability in respect to entering gas while, on the other hand, the varying heat expansion of the solid electrolyte material and of the steel causes only comparatively small mechanical stresses. In this manner, rupture of the steel 6 from the porous electrode layer formed by the electrode material 4 is effectively avoided. As seen in the drawing, the steel 6 for this purpose may have the shape of a corrugated sheet. In another embodiment (not shown), the steel may be in the form of a wire fabric or wire fleece. On the steel sheet, wire fabric or fleece, which acts as collector for electrical current, the current conductors proper, for example in the form of wires 7, are arranged which lead away the current from the hot zone of the inventive oxygen electrode.

The shape or configuration of the solid electrolyte is not critical and it may have any desired form. For example, it may be in the shape of a plate or tube.

The oxygen electrode according to this invention may be combined with any oxygen ion conducting solid electrolyte operated in high temperature galvanic cells. In particular the electrolyte may consist of zirconium oxide stabilized by the incorporation of $Y_2O_3$, $Yb_2O_3$ or of various other rare earth oxides, calcium oxide, or mixtures thereof, the mole fraction of the zirconium oxide being in the range 85 to 95 mole percent.

As oxidic electrode materials, mixed oxides are used which, while reacting with the scale layer 5 of the heat resistant steel 6, do not cause an increase in the scale formation velocity of the steel 6. The oxidic electrode materials or mixed oxides, however, do not react with the solid electrolyte material. As previously stated, the oxides of praseodymium, chromium, nickel and/or cobalt are contained in the mixed oxides.

Upon introduction of oxygen into the spaces 8 and the cavities 3, there occurs an electron exchange between the oxygen molecules and the oxygen ions at the three-phase boundary comprised of solid electrolyte, electrode material and gas space.

The invention will now be described by an example, it being understood, however, that this example is given by way of illustration and not by way of limitation and that many changes may be effected without affecting in any way the scope and spirit of the invention as recited in the appended claims.

EXAMPLE

This experiment was carried out with a solid electrolyte disc consisting of zirconium oxide $ZrO_2$ enriched with 9 mole percent $Y_2O_3$. A porous layer of the same composition was sintered onto the disc to form an irregular top surface corresponding to the surface 1 in the accompanying drawing. The porosity amounted to 60%.

A powder, presintered at 1400° C. and produced from 80% by weight of $PrO_2$ and 20% by weight of NiO, was sintered into the porous layer at 1650° C. In this manner, a porous electrically conducting layer was formed. A steel sheet X 15 CrNiSi 2520 (corresponding to DIN 17006 and AISI 314) was pressed onto the porous layer. The steel sheet grew together or bonded with the electode at the relatively high operating temperature of 1000° C. However, if desired, the steel sheet can be secured to the porous layer in a different manner, e.g. by a suitable heat treatment.

What is claimed is:
1. In an oxygen electrode for galvanic cells having a solid electrolyte capable of conducting oxygen ions and wherein the solid electrolyte is connected with an electrical conductor by means of an electrode material containing mixed oxides, the improvement which comprises the electrode material being composed of praseodymium oxide and at least one oxide of chromium nickel and cobalt and the electrical conductor essentially consists of heat resistant steel having a scale surface in bonding contact with said electrode material.
2. The improvement as claimed in claim 1, wherein the mixed oxide consists essentially of about 90 to 50% by weight of praseodymium oxide and about 10 to 50% by weight of chromium oxide.
3. The improvement as claimed in claim 1, wherein the mixed oxide consists essentially of about 90 to 50% by weight of praseodymium oxide and about 10 to 50% by weight of nickel oxide.
4. The improvement as claimed in claim 1, wherein the mixed oxide consists essentially of about 90 to 50% by weight of praseodymium oxide and about 10 to 50% by weight of cobalt oxide.
5. The improvement as claimed in claim 1, wherein the electrode is the cathode in a fuel cell.
6. The improvement as claimed in claim 1, wherein the mixed oxide consists essentially of about 90 to 50% by weight of praseodymium oxide, about 10 to 50% by weight of nickel oxide and about 10 to 50% by weight of chromium oxide, the total of the oxides of chromium and nickel amounting together to not less than 10% by weight and to not more than 50% by weight.
7. In a galvanic cell, a solid electrolyte having an irregular surface containing cavities, mixed oxides accommodated in said cavities and an electrical conductor essentially consisting of heat resistant steel having a scale layer, said mixed oxides being in intimate bonding contact with said scale layer and being composed of praseodymium oxide and at least one oxide of chromium nickel and cobalt.
8. A galvanic cell as claimed in claim 7, wherein the mixed oxides consist essentially of about 90 to 50% by weight of praseodymium oxide and 10 to 50% by weight of at least one of chromium oxide, nickel oxide and cobalt oxide.
9. A galvanic cell as claimed in claim 7, wherein said steel conductor is a corrugated plate, a wire fabric or a wire fleece.

References Cited

UNITED STATES PATENTS

| | | | |
|---|---|---|---|
| 3,138,490 | 6/1964 | Tragert et al. | 136—86 |
| 3,300,344 | 1/1967 | Bray et al. | 136—86 |
| 3,377,203 | 4/1968 | Mobius et al. | 136—86 |
| 3,405,008 | 10/1968 | Dilworth et al. | 136—86 |

WINSTON A. DOUGLAS, Primary Examiner

A. SKAPARS, Assistant Examiner

U.S. Cl. X.R.
136—86